Feb. 10, 1959 J. P. LEKAS 2,873,073

TAPE RECORDER AND TRANSCRIBER DRIVE SYSTEM

Filed Oct. 18, 1952 3 Sheets-Sheet 1

INVENTOR.
JOHN P. LEKAS

BY William P. Lane

ATTORNEY

INVENTOR.
JOHN P. LEKAS
BY William R. Lane
ATTORNEY

INVENTOR.
JOHN P. LEKAS
BY William R. Lane
ATTORNEY

United States Patent Office 2,873,073

Patented Feb. 10, 1959

2,873,073

TAPE RECORDER AND TRANSCRIBER DRIVE SYSTEM

John P. Lekas, Hollywood, Calif., assignor to North American Aviation, Inc.

Application October 18, 1952, Serial No. 315,548

4 Claims. (Cl. 242—55.12)

This invention pertains to a tape recorder and transcriber drive system, and in particular to a light weight drive for a compact tape recorder and transcriber.

When destructible guided missiles are launched, it is necessary to make a permanent record of the instrument readings and flight parameters of the missile during its flight. Magnetic recording devices have an advantage over mechanical recording devices in that magnetic recording devices are not responsive to mechanical vibration errors, and record more rapidly than mechanical devices.

This invention contemplates a compact, reliable tape recorder drive which is automatically and continuously reversible. The recorder records information upon a channel, then reverses and records upon another channel, and reverses and records upon the original channel. Of course, it is necessary to erase the information upon any particular channel immediately before new information is recorded thereon. Thus this invention provides an opportunity for continuous inspection of instrument readings by continuously recording them, and erasing them after they have been stored for a predetermined period of time. Therefore this invention contemplates a compact tape recorder drive system of economical construction, requiring a minimum of tape to record a comparatively small amount of information.

It is therefore an object of this invention to provide a small, compact, and reliable tape recorder and transcriber which may be operated continuously.

It is another object of this invention to provide a small, compact, and reliable tape recorder and transcriber utilizing a single lamination recording and transcribing magnetic head which is shaped to conform to the path of the magnetic tape.

It is still another object of this invention to provide a magnetic recording and transcribing head in combination with a magnetic medium wherein said head conforms to the shape of the path of said magnetic medium.

It is another object of this invention to provide a compact and reliable multichannel tape recorder and transcriber drive system.

It is another object of this invention to provide means for handling a tape which is wound from one reel to another reel upon the same shaft.

It is another object of this invention to provide an automatically and continuously reversible tape recorder which uses an economical amount of tape.

It is another object of this invention to provide means for automatically driving a magnetic tape in a predetermined direction in response to signals upon the tape.

Other objects of invention will become apparent from the following description taken in connection with the accompanying drawings, in which Fig. 1 is a side view of one embodiment of this invention;

Figure 8:
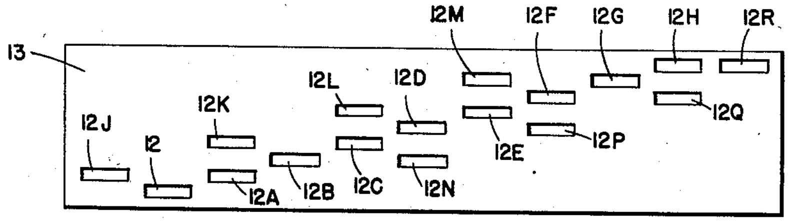

And Fig. 8 is a top schematic of a typical single lamination magnetic head of this invention.

Figure 1:
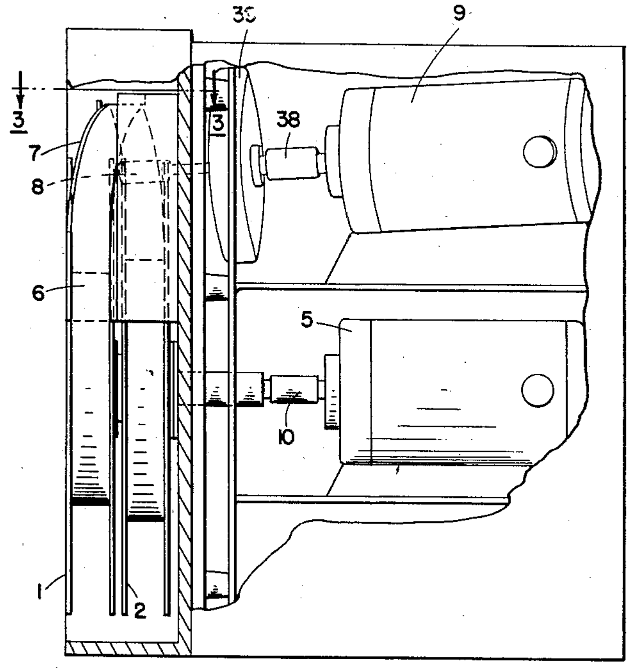
Figure 3:
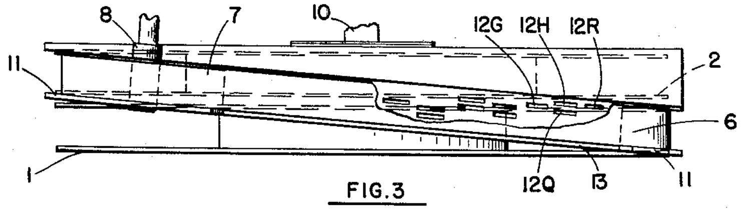
Fig. 3 is a view of this invention taken at 3—3 in Fig. 1.
Figure 2:
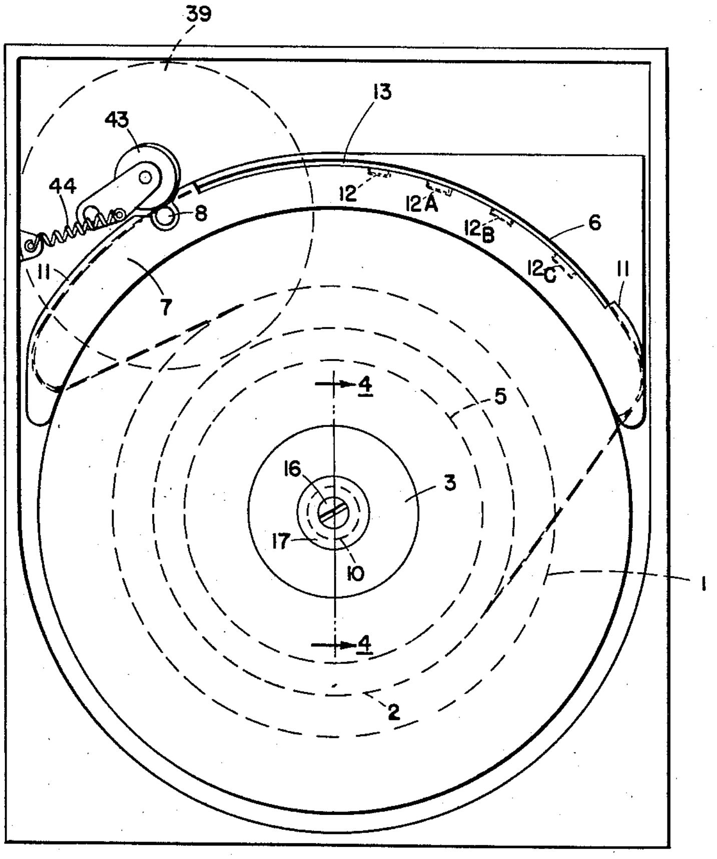
Fig. 2 is a plan view of the embodiment shown in Fig. 1.
Figure 4:
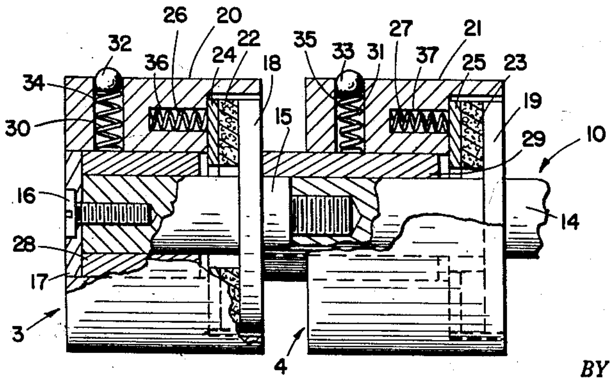
Fig. 4 is a section view of this invention taken at 4—4 in Fig. 2.

In Figs. 1, 2, and 3, reels 1 and 2 are driven by motor 5 and shaft 10 in the same direction by means of slip clutches 3 and 4 shown in detail in Fig. 4. Tape 6 is wound upon reels 1 and 2 in a direction whereby the rotation of slip clutches 3 and 4 always places the tape in tension regardless of the direction of movement of tape 6. Tape shelf 7 guides tape 6 from one reel to the other, and thus facilitates the placing of both reels upon the same shaft. Tape 6 winds from reel 1 over tape shelf 7 onto reel 2 or winds from reel 2 over tape shelf 7 onto reel 1. Tape 6 is driven by capstan 8, and the direction of movement of tape 6 is determined by the direction of rotation of capstan 8. Tape 6 is held against capstan 8 by idler roller 43 which is spring loaded by spring 44. Capstan 8 is driven by motor 9 and shaft 38. Flywheel 39, upon shaft 38, tends to hold the speed of capstan 8 constant. Tape shelf 7 is at an angle with the axis of shaft 10 of reels 1 and 2. At the end of tape shelf 7 are tape guides 11. The recording and reproducing heads 12, 12A, 12B, 12C, 12D, 12E, 12F, 12G, and 12H, as well as erasing heads 12J, 12K, 12L, 12M, 12N, 12P, 12Q, and 12R, are of the laminoid type shown and claimed in application Serial No. 265,254, filed January 7, 1952, in the names of John P. Lekas and Lester L. Kilpatrick, for "Magnetic Disc Data Storage" wherein the core of each separate coil is formed from a single lamination. Lamination 13 of this invention is curved to the contour of the path of tape 6. Tape 6 moves in contact with lamination 13 and the channels of information are recorded and reproduced by heads 12, 12A, 12B, 12C, 12D, 12E, 12F, 12G, and 12H which are staggered to prevent mechanical interference between the coils. Because each head is completely surrounded by lamination 13, there is no electrical interference or cross talk between the channels. There is at least one head for each channel of desired information upon tape 6. In Fig. 4 shaft 10 is made in two pieces 14 and 15. Piece 15 is screwed into piece 14. Clutch assembly 3 is identical to clutch assembly 4 in both structure and operation. Screw 16 and plug 17 retain clutch assemblies 3 and 4 and shaft portions 14 and 15 together. Shaft 10 drives discs 18 and 19. Reel hubs 20 and 21 are driven from discs 18 and 19, respectively, but slip with respect to discs 18 and 19. The torque upon hubs 20 and 21 is just sufficient to maintain tension in tape 7. Clutch material 22 and 23, which is preferably of felt, slides against discs 18 and 19 with just enough friction to create the required tension in tape 6. Material 22 and 23 is held against plates 18 and 19 by means of pressure plates 24 and 25 and springs 26 and 27. Reel hubs 20 and 21 are supported by the bearing surface between shaft 10 and bearings 28 and 29. Springs 30 and 31 are positioned between balls 32 and 33 and bearings 28 and 29. Balls 32 and 33 are retained by a lip at the end of holes 34 and 35. There are preferably three springs 30, three springs 31, three holes 34, three holes 35, 3 balls 32, and three balls 33 equally spaced about the axis of shaft 10. Similarly, there are preferably three springs 26, three springs 27, three holes 36, and three holes 37 equally spaced about the axis of shaft 10.

Figure 5:
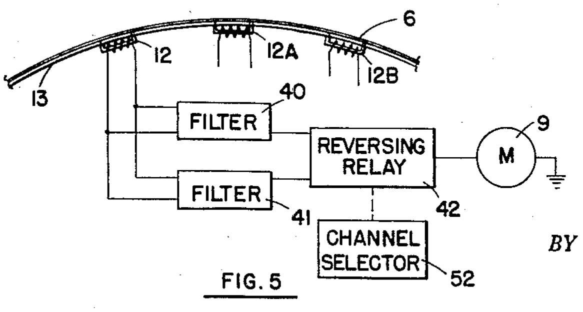
Fig. 5 is a block diagram of a means for changing the direction of the tape and switching tape channels in response to a predetermined program.

In Fig. 5, a signal of a first frequency is placed upon one end of one channel of tape 6, while a signal of a second frequency is placed upon the other end of the same channel of tape 6. These signals may be placed at points other than the ends of the tape if it is desired to cause the tape to reverse before it reaches the end. Head 12 is assigned to monitor this control channel. Head 12 is connected to filter 40 and filter 41. Filter 40 is responsive to the first frequency, while filter 41 is responsive to the second frequency. Filters 40 and 41 are connected to relay 42 which, in turn, is connected and controls motor 9 and channel selector 52.

Figure 6:
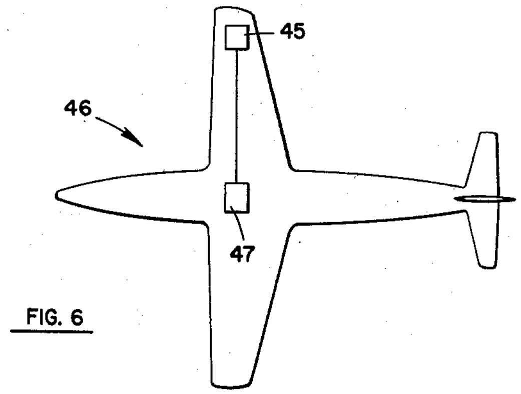
Fig. 6 is a schematic drawing showing the typical position of a recorder of this invention in an aircraft.

In Fig. 6, tape recorder and transcriber 45 is placed within aircraft 46, for example, in a wing tip. Recorder 45 is connected to aircraft instruments 47 through channel selector 52, shown in Fig. 5. Aircraft instruments 47, such as pressure transducer 48, temperature transducer 49, heading reference 50, and intercommunication circuit 51, shown more particularly in Fig. 7, are adapted to transform instrument readings into electrical information suitable for storage in magnetic form upon tape 6.

Figure 7:
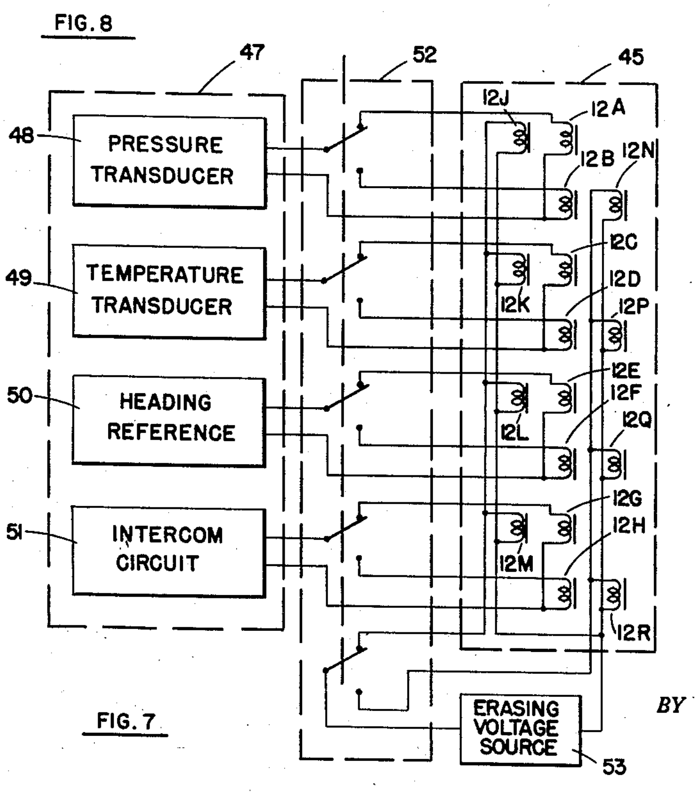
Fig. 7 is a block diagram of this invention as applied to an aircraft.

In Fig. 7, instruments 47 are connected to recorder 45 through channel selector 52 which is actuated by means of relay 42, shown more particularly in Fig. 5. The circuits connected with pressure transducer 48, temperature transducer 49, heading reference 50, and intercommunication circuit 51 are identical in structure and operation. A description of the structure and operation of pressure transducer 48, together with channel selector 52, recording heads 12A and 12B, and erasing heads 12J and 12N are described herein. Pressure transducer 48 is alternatively connected to recording head 12A or recording head 12B in response to the movement of reversing relay 42. When pressure transducer 48 is connected to recording head 12A, erasing voltage source 53 is connected through channel selector 52 to erasing head 12J. When pressure transducer 48 is connected to recording head 12B, erasing voltage source 53 is connected through channel selector 52 to erasing head 12N.

In Fig. 8, head 12 monitors the control channel upon tape 6 which is shown in Fig. 3. Heads 12A, 12B, 12C, 12D, 12E, 12F, 12G, and 12H are recording heads for placing information upon tape 6 and may be used to reproduce the information upon tape 6 when necessary. Erasing heads 12J, 12K, 12L, and 12M are placed to the left of recording heads 12A, 12C, 12E, and 12G, respectively. Erasing heads 12N, 12P, 12Q, and 12R are placed to the right of recording heads 12B, 12D, 12F, and 12H, respectively, for reasons which are presently explained.

In operation, the device of this invention continuously records a record of instrument readings or conversation, stores the information for a predetermined time, then erases it. While the erasing feature is not necessary for the invention, it is desirable upon a commercial aircraft wherein the only information that is needed is that immediately prior to a crash. All information older than, for example, a half hour is erased in the interest of compactness.

Shaft 10 is driven by motor 5. Discs 18 and 19 turn in the same direction and slide against bearing surfaces 22 and 23 and cause reel hubs 20 and 21 to tend to turn in the direction of shaft 10. However, reel hubs 20 and 21 do not necessarily actually turn in the same direction as shaft 10. When capstan 8 drives tape 6 in one direction, hub 20 turns in the direction of shaft 10, while hub 21 turns opposite to the direction of shaft 10. When capstan 8 reverses direction, hub 21 turns in the direction of shaft 10, while hub 20 turns opposite to the direction of shaft 10. When capstan 8 is not turning, hubs 20 and 21 do not turn. At all times, hubs 20 and 21 are urged to turn in the direction of shaft 10, and thereby maintain tension in tape 6 regardless of the direction of motion of capstan 8. Capstan 8 is driven by motor 9 which is controlled by relay 42 in response to signal means upon one channel of tape 6.

In order to continuously record information upon tape 6 of recorder 45, a signal of one frequency is placed upon one end of one channel of tape 6, while a signal of the second frequency is placed upon the other end of the same channel. Head 12 passes the signals to filters 40 and 41 which are tuned to pass the first and second frequencies, respectively. When filter 40 passes a signal, relay 42 is actuated to cause channel selector 52 to select a tape channel for each input to recorder 45 and to cause motor 9 to turn in one direction, while a signal through filter 41 actuates relay 42 to cause motor 9 to turn in the opposite direction and to cause selector 52 to select another channel for each input to recorder 45. The next signal through filter 40 causes channel selector 52 to reselect the original channel and motor 9 to turn in the original direction. Thus two channels upon tape 6 are assigned to each input to recorder 45. Recorder 45 records forward upon one channel, automatically reverses and records upon the second channel when it reaches the end of the tape, then automatically reverses again and records upon the original channel when it reaches the other end of the tape. All information on each tape channel ahead of the recording head is erased by erasing heads, shown more particularly at 12J, 12K, 12L, 12M, 12N, 12P, 12Q, and 12R in Fig. 8. Recording heads 12A, 12C, 12E, and 12G are energized when tape 6 passes from right to left over lamination 13. Erasing heads 12J, 12K, 12L, and 12M are energized with heads 12A, 12C, 12E, and 12G are energized so that information which was previously recorded upon tape 6 is erased upon the channels associated with these heads in order that new information can be recorded upon those channels. Recording heads 12B, 12D, 12F, and 12H together with erasing heads 12N, 12P, 12Q, and 12R are energized when tape 6 passes from left to right over lamination 13 for the same reason.

Thus the device of this invention is a compact tape recording and transcribing unit which records and stores a continuous record for a predetermined period immediately prior to the time of recording. This device eliminates flexible shafts or belts which are subject to breakage, and rim drives which slip or become eccentric. The tape path geometry of the device of this invention is a smooth curve with a minimum of bends which therefore decreases flutter components in the signal. When the tape reaches its ends it is automatically reversed and each input signal to the recorder is automatically transferred from one of its two assigned channels to the other of its two assigned channels. In the event that aircraft 46 is destroyed, information recorded upon tape 6 shows the readings of the aircraft instruments and the speech of the aircraft crew for a predetermined period, for example, a half hour immediately prior to destruction of the aircraft.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A tape recorder and transcriber drive system comprising a first and second reel, a shaft, said first and second reels being mounted on said shaft, slip clutch means connected to cause said shaft to drive said reels, said slip clutch means simultaneously urging rotation of both said reels, a magnetic tape wound upon said reels, means for transporting said tape from the first of said reels to the second of said reels, means for driving said tape, and means for driving said shaft.

2. A compact tape recorder and transcriber drive system comprising a first and second reel, a magnetic tape wound upon said reels, a first and second friction clutch simultaneously urging said reels to take up said tape, a shaft, said first and second reels being mounted on said shaft, means for driving said shaft in one direction, said first friction clutch disposed to engage said shaft with said first reel, said second friction clutch disposed to engage said shaft with said second reel, and bidirectional driving means for driving said tape in reversible directions.

3. A compact tape recorder and transcriber drive system comprising a shaft, a first and second reel mounted upon said shaft, motor means for driving said shaft in a single direction of rotation, first and second slip clutch means between said shaft and said first and second reels, said clutches disposed to engage said shaft with said first and second reels respectively and simultaneously urge said reels to rotate in a particular direction, said first and second slip clutch means engaging said shaft with said reels independently of the direction of tape travel, a tape wound upon both said reels in the same direction and passing from said first reel onto said second reel, and bidirectional driving means for driving said tape from one of said reels to the other.

4. A tape recorder and transcriber drive system comprising a first and second reel, clutch means, unidirectional drive means comprising a shaft connected through said clutch means to said reels, said drive means and said clutch means urging both said reels to rotate in the same direction, said clutch means simultaneously engaging said reels with said shaft, a magnetic tape wound on both said reels, means for transferring said tape from one of said reels to the other and means for driving said tape.

References Cited in the file of this patent

UNITED STATES PATENTS

| | | |
|---|---|---|
| 1,261,508 | Gamble | Apr. 2, 1918 |
| 2,213,631 | Heller et al. | Sept. 3, 1940 |
| 2,349,018 | Tasker | May 16, 1944 |
| 2,463,001 | Shrader | Mar. 1, 1949 |
| 2,526,783 | Toogood | Oct. 24, 1950 |
| 2,535,478 | Arndt et al. | Dec. 27, 1950 |
| 2,536,030 | Camras | Jan. 2, 1951 |
| 2,570,648 | Crawford | Oct. 9, 1951 |
| 2,592,652 | Buhrendorf | Apr. 15, 1952 |
| 2,706,638 | Bruderlin et al. | Apr. 19, 1955 |